United States Patent [19]
Loving

[11] Patent Number: 5,313,784
[45] Date of Patent: May 24, 1994

[54] SOLID FUEL PINWHEEL POWER PLANT AND METHOD

[75] Inventor: Ronald E. Loving, Simi Valley, Calif.

[73] Assignee: Hughes Aircraft Company, Los Angeles, Calif.

[21] Appl. No.: 961,305

[22] Filed: Oct. 15, 1992

[51] Int. Cl.$^5$ .............................................. F02C 03/14
[52] U.S. Cl. ................................... 60/39.35; 60/39.47
[58] Field of Search .................. 60/39.34, 39.35, 39.47

[56] References Cited

U.S. PATENT DOCUMENTS

| | | | |
|---|---|---|---|
| 762,175 | 6/1904 | Lees | 60/39.35 |
| 2,425,904 | 8/1947 | Vernon | 60/39.35 |
| 3,121,526 | 2/1964 | Morley | 415/66 |
| 3,332,235 | 7/1967 | Wilhite | 60/39.35 |
| 4,825,648 | 5/1989 | Adamson | 60/226.1 |
| 5,010,728 | 4/1991 | Joy | 60/39.464 |

Primary Examiner—Richard A. Bertsch
Assistant Examiner—Michael I. Kocharov
Attorney, Agent, or Firm—W. K. Denson-Low

[57] ABSTRACT

A low noise power plant (100) for providing thrust to a missile (102) having a solid fuel propellant (114) for generating a pressurized gas. A revolving turbine (104) which is integral with the solid fuel propellant (114) converts the pressurized gas to rotary motion. A drive shaft (138) transfers the rotary motion to a load. In a preferred embodiment, the power plant (100) is utilized to drive a projectile (102). The revolving turbine (104) includes a combustion chamber (106) containing the solid fuel stick (114) and a plenum (108) having a plurality of angled openings (120) formed in the outer periphery thereof. The drive shaft (138) connects the revolving turbine (104) to a load such as a fan type propeller (134) via a speed reduction gearbox (136). The solid fuel stick (114) is ignited by conventional methods and burned to provide pressurized gas which is directed to the angled openings (120). The pressurized gas escapes from the angled openings (120) producing rotary motion in the revolving turbine (104) and the drive shaft (138). The rotating fan type propeller (134) compresses air for generating the thrust of the power plant (100). The compressed air is a mixture of exhaust gases (124) and ambient air which reduces the heat content and thus, the detectability of the projectile (120) by infrared devices.

7 Claims, 6 Drawing Sheets

SOLID FUEL PINWHEEL POWER PLANT AND METHOD

BACKGROUND OF THE INVENTION

1. Field of the Invention

The present invention relates to power plants. More specifically, the present invention relates to methods and apparatus for a pinwheel power plant that employs solid fuel propellant.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Many different types of power plants are known in the art for providing thrust to propel a projectile. Examples include jet engines, piston engines and rocket motors of various designs. Each of these power plant designs suffer from a number of problems during the launch and flight stages of the projectile. The problems common to each power plant design include the generation of excessive noise and heat. Also, in the case of a rocket motor, large amounts of smoke can be generated.

Low detectability of a projectile during target approach is necessary in stealth operations. However, the generation of excessive noise during the launch and flight stages increases the probability that the projectile will be detected upon approach. Further, generation of large amounts of heat by the projectile motor can be detected by infrared sensors such as the forward looking infrared devices utilized by deployed ground troops and aircraft. The heat generated by the projectile motor can also be detected visually by utilizing night vision goggles. Likewise, the projectile can also produce a visible smoke trail. The visible smoke trail generated by certain rocket motors facilitates tracking the projectile and enables the determination of the origin of the launch point. The density of the smoke trail is dependent upon the type of rocket motor propellant employed. Each of these problems increase the probability of projectile detection during approach to the target.

Specific examples of power plant designs capable of providing thrust to propel a projectile include solid and liquid fueled rocket motors, air turbo rockets and jet turbine engines. Solid fuel rocket motors employing solid fuel propellants are known. The solid fuel propellant of certain rocket fuel motors burns at an accelerated rate producing a pressurized exhaust gas. The pressurized exhaust gas is then expelled from an exhaust nozzle at a supersonic rate to propel the projectile. The expanding gas exiting the exhaust nozzle is very noisy, generates excessive heat and creates a characteristic IR signature. In general, the burn rate of the solid fuel propellant is determined by the configuration of the solid fuel element employed. The amount of surface area of the solid fuel propellant exposed to burning determines the gas pressure generated. The more surface area of the solid fuel propellant exposed to burning, the higher the gas pressure generated. Solid fuel propellants having a large surface area exposed to burning tend to burn much faster. The generation of excessive noise, heat and smoke by the solid fuel rocket tend to increase the detectability of the projectile.

The second example of a power plant design capable of providing thrust to propel a projectile is an air turbo rocket. An air turbo rocket, which is known in the art, is capable of burning solid or liquid fuel to drive a turbine or compressor. The operation of the turbine or compressor produces increased gas pressure in an exhaust tube. When ambient air is funneled into the exhaust section of the air turbo rocket, the fuel is reignited and burned. This design effectively operates as an after burner. Because of the after burner effect, air turbo rockets are very noisy and are subject to audible detection. Liquid fuel is also utilized to provide thrust in other power plants such as in jet turbine engines, liquid fuel rocket motors and piston engines. Numerous problems exist when attempting to contain liquid jet fuel in a fuel tank on a projectile. The utility and purity of the liquid jet fuel can be effected by the elements and by contamination. Additionally, the heavy mass of the liquid fuel adds to the load of the projectile during flight. Further, as the liquid fuel is consumed, the dynamics of the projectile are altered.

Unfortunately, the generation of excessive noise and heat tend to make the projectile power plant designs of the prior art vulnerable to detection by audible and infrared devices. Further, the creation of a visible smoke trail also causes the projectile to be easier to track. Therefore, the power plants of the prior art which are designed for use with a projectile are vulnerable to detection and are not suitable for use in stealth operations.

A final example of a power plant known in the art that employs solid fuel propellant is a pinwheel motor. A pinwheel motor is generally toroidal or ring shaped and is designed to rotate about a central axis passing through the center thereof. The ring shaped pinwheel is constructed to include a plurality of compartments formed therein with each adjacent compartment being spaced apart by a separation zone. Each compartment houses a solid fuel stick and each solid fuel stick includes a fuse which is inserted in the respective separation zone. The fuse ignites the solid fuel propellant by a known method and the fuse is burnt. Once the fuse for a particular compartment is burnt, the separation zone associated with that compartment becomes the exhaust port for that compartment. The solid fuel propellant in each compartment is thereafter combusted at a specified rate generating a high pressure exhaust gas. The high pressure gas is exhausted to atmosphere from each compartment through the respective exhaust port. The exhaust from the multiple exhaust ports cause the pinwheel to spin about the central axis. Generally, the pinwheel motor does not drive a load or propel a projectile but is employed in pyrotechnic displays.

Thus, there is a need in the art for improvements in solid fuel pinwheel power plant designs for use with a projectile which exhibit the characteristic of low detectability and are suitable for use in stealth operations.

SUMMARY OF THE INVENTION

The need in the art is addressed by the low noise power plant of the present invention. The invention includes a solid fuel propellant for generating a pressurized gas. A revolving turbine which is integral with the solid fuel propellant converts the pressurized gas to rotary motion. A drive shaft transfers the rotary motion to a load.

In a preferred embodiment, the power plant is utilized to drive a projectile. The revolving turbine includes a combustion chamber containing the solid fuel stick and a plenum having a plurality of angled openings formed in the outer periphery thereof. The drive shaft connects the revolving turbine to a load such as a fan type propeller via a speed reduction gearbox. The solid fuel stick is ignited by conventional methods and burned to provide pressurized gas which is directed to the angled openings. The pressurized gas escapes from the angled openings producing rotary motion in the revolving turbine and the drive shaft. The rotating fan type propeller compresses air for generating the thrust of the power plant. The compressed air is a mixture of exhaust gases and ambient air which reduces the heat content and thus, the detectability of the projectile by infrared devices. The pressurized gas expelled from the revolving turbine is near atmospheric pressure and at a relatively low volume which minimizes the generation of noise.

DESCRIPTION OF THE INVENTION

Figures 1, 2:
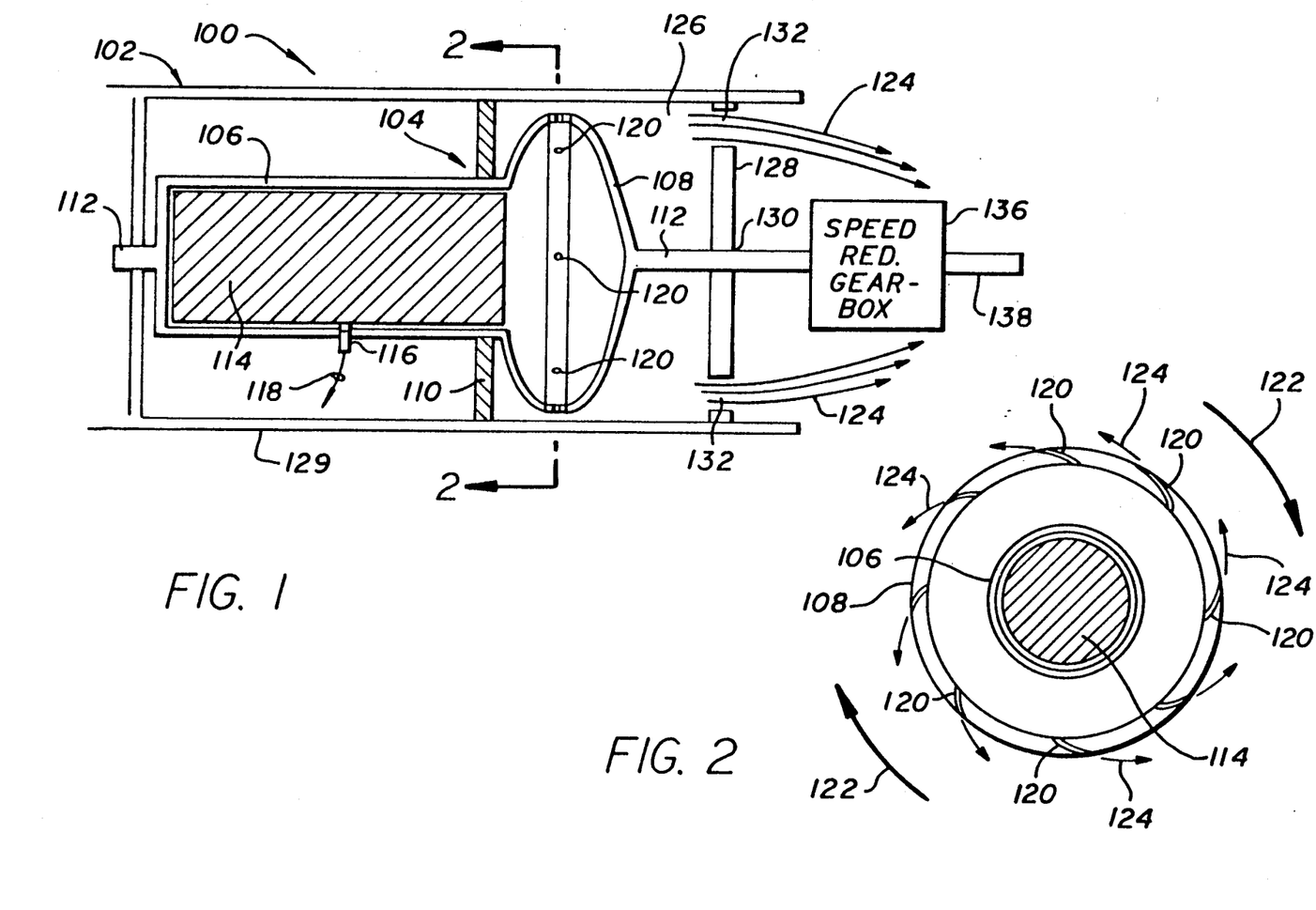
FIG. 1 is a simplified sectional side view of an illustrative embodiment of the solid fuel pinwheel power plant of the present invention positioned within a typical projectile tube.
FIG. 2 is a cross-sectional view of the solid fuel pinwheel power plant taken along the line 2—2 of FIG. 1 showing the entire rotating plenum.
Figure 3:
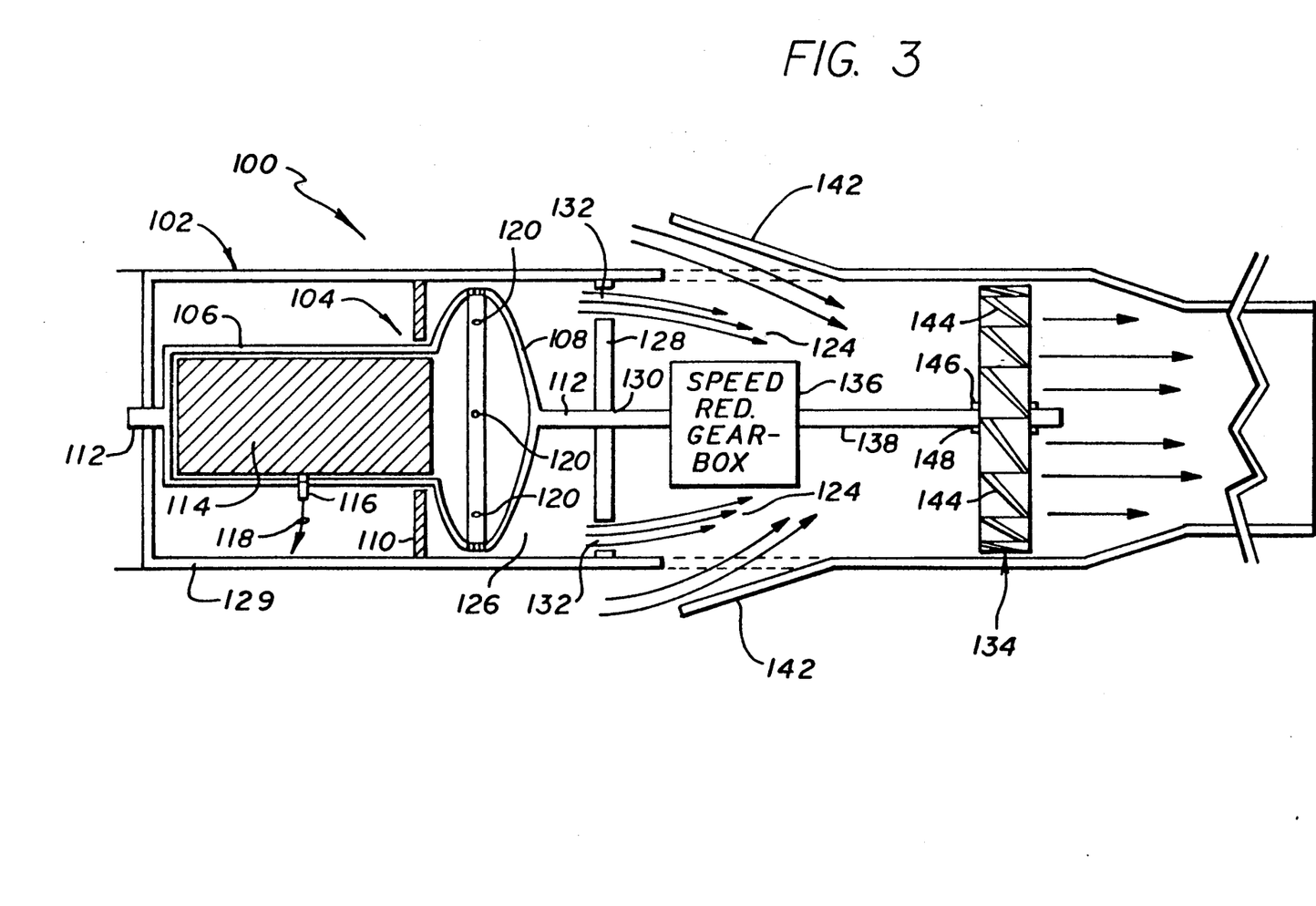
FIG. 3 is a more detailed sectional side view of the solid fuel pinwheel power plant of FIG. 1 showing a ducted fan type propeller as a load positioned within the projectile tube.
Figure 4:
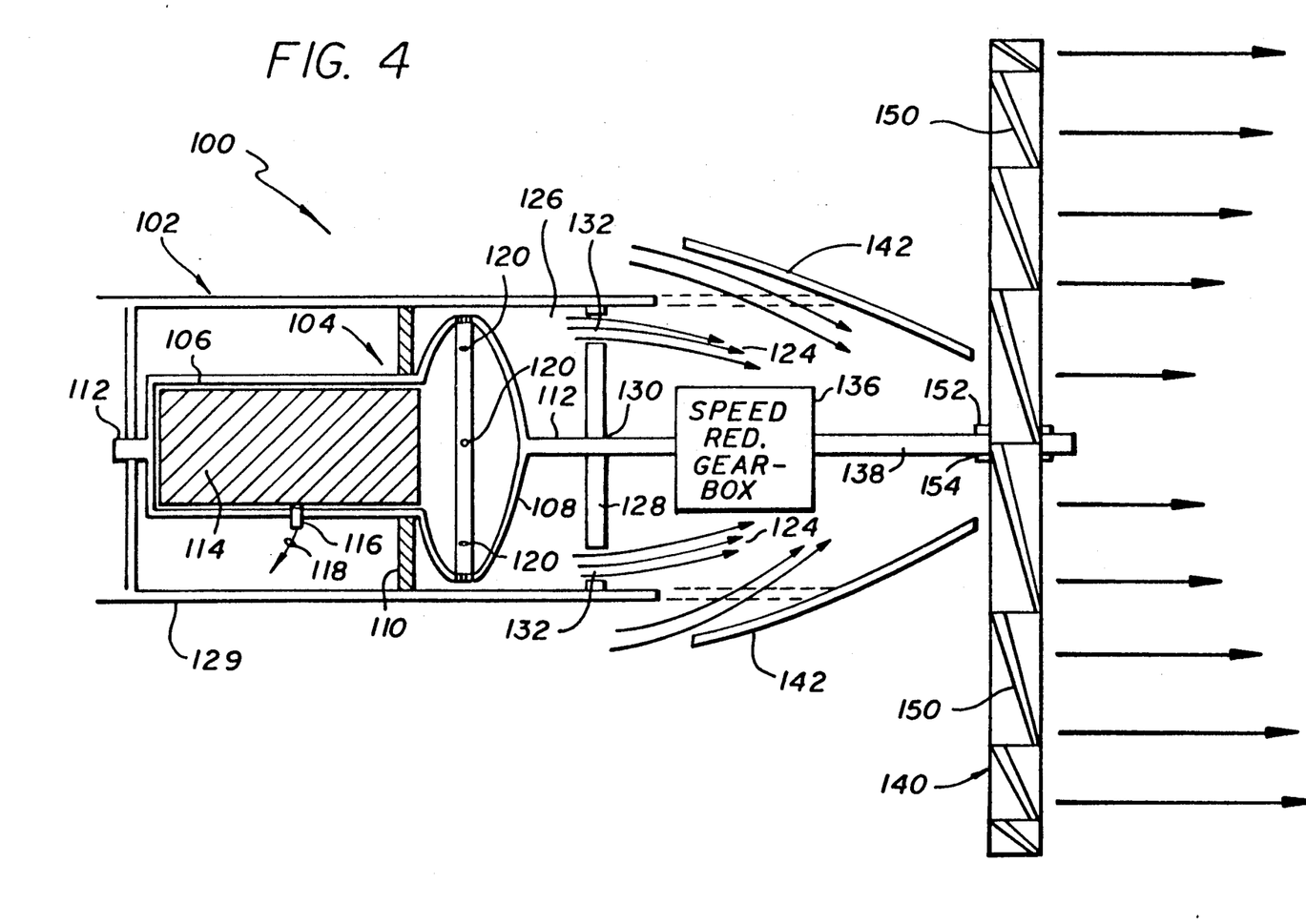
FIG. 4 is a more detailed sectional side view of the solid fuel pinwheel power plant of FIG. 1 showing an unducted fan type propeller as a load positioned external to the projectile tube.

The invention is embodied in a solid fuel pinwheel power plant 100 located within a projectile 102 as shown in FIGS. 1, 3 and 4. The power plant 100 includes a revolving turbine 104 containing a combustion chamber 106 and a plenum 108. The combustion chamber 106 and the plenum 108 are integral in construction. The revolving turbine 104 is supported within the projectile 102 by a structural member 110 and a turbine axis 112 in a manner known in the art.

The combustion chamber 106 contains a stick of solid fuel 114 for generating pressurized gases of a specific pressure and velocity. The solid fuel stick 114 preferably employed in the present invention is a slow burning stick in which only one end surface is ignited as is known in the art. For example, in an end-burning 2" diameter fuel stick, only one 2" end diameter is ignited. The diameter of the solid fuel stick 114 determines the amount of gas produced and the length of the fuel stick 114 determines how long the gases will be produced. Thus, the diameter of the fuel stick 114 and the burning rate control the density, temperature and pressure of the gases generated. By burning the solid fuel stick 114 and providing a pressurized gas source, high energy can be generated to produce thrust to propel the projectile 102.

The solid fuel stick 114 can be made from smokeless insensitive munitions propellant and have dimensions suitable for the intended application. The chemical base of the fuel stick 114 can be a nitro-based solid fuel, for example, nitrocellulose or nitroglycerin. Other chemical compositions are also available to serve as the fuel base of the fuel stick 114. The output of the solid fuel stick 114 is rated in the volume and pressure of the gases generated. The gases generated are determined by the type of solid fuel stick 114 employed. The gases generated include, but are not limited to, $CO_2$, $H_2$, $O_2$, $NO$ and $N_x$. The pressurized gases generated by the fuel stick 114 are at a relatively low pressure and volume which minimizes the generation of noise. When the power plant 100 is employed in the projectile 102, the output is rated in thrust. However, in commercial applications such as in driving a generator or wench, the output is rated in horsepower.

The solid fuel stick 114 is energized or ignited by a squib or igniter 116 which is shown symbolically in FIGS. 1, 3 and 4. The squib 116 can be, for example, a glow plug which is controlled from a remote location such as a launch panel. Specifically, the squib 116 applies electrically generated heat to the fuel stick 114 from a source (not shown) through a power lead 118 to achieve ignition and burning of the fuel stick 114. If the squib 116 functions as a glow plug for the specific fuel stick 114 utilized, the electrical energy provided through the power lead 118 may be continuous to sustain ignition and burning. However, other types of solid fuel sticks 114 having different burning characteristics may require only a pulse of electrical energy in the form of a spark to achieve ignition.

The solid fuel stick 114 is contained in the combustion chamber 106. The squib 116 is shown penetrating the combustion chamber 106 in FIGS. 1, 3 and 4. One end of the solid fuel stick 114 is sealed by the combustion chamber 106 while the other end is exposed to the plenum 108. The pressurized gases generated by the fuel stick 114 are directed to the plenum 108 to spin the revolving turbine 104 about the turbine axis 112 as described in more detail hereinbelow. The revolving turbine 104 is of a pinwheel design which is driven by the hot pressurized gases generated by the solid fuel stick 114 housed within the combustion chamber.

The plenum 108 of the revolving turbine 104 includes a plurality of angled exhaust openings or gas jets 120 positioned along the inner periphery or circumference of the plenum 108 as shown in FIGS. 1–4. The gas jets 120 permit the hot pressurized gases generated by the burning solid fuel stick 114 to escape from the plenum 108. The gas jets 120 are angled through the plenum 108 in such a manner as to permit the rotation of the revolving turbine 104 and the turbine axis 112. In particular, FIG. 2 illustrates that the rotation (designated by numeral 122) of the revolving turbine 104 and the turbine axis 112 is in a direction opposite to the direction of the exhaust gases (designated by numeral 124). Thus, the rotation of the revolving turbine 104 and the turbine axis 112 carries with it the combustion chamber 106 including the solid fuel stick 114 located therein and the plenum 108.

The rotation of the turbine axis 112 developes the torque necessary to drive a load such as a fan type propeller as described hereinbelow. Only one line of gas jets 120 is shown in FIGS. 1-4 for illustration purposes only. However, any number of separate lines of gas jets 120 can be formed in the plenum 108 that is consistent with the plenum design. In general, the greater the number of gas jets 120 formed in the plenum 108, the more power and speed of rotation is transferred to the revolving turbine 104. The density, temperature pressure and volume of the gases generated by the solid fuel stick 114 and the number of gas jets 120 determine the power and rotational speed of the plenum 108 and the turbine axis 112 in RPM. As an example, if the plenum 108 of the revolving turbine 104 has a diameter of 5" and a drive shaft length of 4" and weighs approximately five pounds, the power plant 100 can be rated to provide a forty horsepower output.

The exhaust gases 124 which are transmitted to the inner cavity of the plenum 108 and which are expelled from the plurality of gas jets 120 are at or near atmospheric pressure. This indicates that the plenum 108 has absorbed almost all of the energy contained in the hot pressurized gases. Therefore, there is a low probability that noise will be generated by the gases. This feature further minimizes the generation of noise in the entire power plant 100 making it more difficult to detect with audible detection devices. Thus, the power plant 100 is more attractive for use in stealth type devices.

The exhaust gases 124 are then directed from an exhaust region 126 of the revolving turbine 104 to a diffuser plate 128 as shown in FIGS. 1, 3 and 4. In the example implementation of the present invention, the diffuser plate 128 is a metallic plate mounted to the inside surface of the metal housing 129 of the projectile 102. The diffuser plate 128 includes a penetration 130 for the passage of the turbine axis 112 therethrough. One of the functions of the diffuser plate 128 is to direct the exhaust gases 124 out of the exhaust region 126 of the revolving turbine 104 through a diffuser plate passageway 132 to a load such as a ducted fan type propeller 134 positioned within the projectile 102 as shown in FIG. 3. Another function of the diffuser plate 128 is to absorb additional energy from the gases. This action causes the gases to slow down further minimizing the noise generated by the power plant 100.

The rotating turbine axis 112 can be connected to a speed reduction gearbox 136 to achieve the proper rotational speed for the load attached to the power plant 100. The load is attached to the power plant 100 via an output drive shaft 138 extending from the speed reduction gearbox 136 as shown in FIGS. 1, 3 and 4. It is noted that the speed reduction gearbox 136 can be of a conventional design and is an optional feature that may not be necessary in a particular load application. A plurality of loads can be driven by the power plant 100. When the power plant 100 is utilized to propel the projectile 102, an appropriate load is the ducted fan type propeller 134 shown in FIG. 3 or an unducted fan type propeller 140 shown in FIG. 4.

The metal housing 129 of the projectile 102 includes a vent flap 142 as shown in both FIGS. 3 and 4. The function of the vent flap 142 is to admit ambient air into the projectile 102. The ambient air is drawn into the projectile 102 by either the ducted fan type propeller 134 shown in FIG. 3 or the unducted fan type propeller 140 shown in FIG. 4. The ambient air is then mixed with the exhaust gases 124 from the revolving turbine 104 to dissipate the heat contained therein. The dissipation of the heat in the exhaust gases makes the power plant 100 and the projectile 102 less vulnerable to detection by infrared type sensor devices. The mixture is then fed to either the ducted or unducted fan type propellers 134 or 140, respectively, to provide the thrust to propel the projectile 102.

The ducted fan type propeller 134 is internally located within the metal housing 129 as shown in FIG. 3. The ducted fan type propeller 134 serves to provide the thrust to the projectile 102 by compressing (e.g., speeding up) the air as the air passes through the metal housing 129. Since the ducted fan type propeller 134 is located inside of the metal housing 129, it is usually smaller than and produces less thrust than the unducted fan type propeller 140 shown in FIG. 4. A plurality of fan blades 144 of the ducted fan type propeller 134 is shown in FIG. 3. The fan blades 144 are shown mounted to a center cog 146 having a penetration 148 for accommodating the output drive shaft 138. The fan blades 144 serve to compress the mixture of exhaust gases 124 and ambient air. The number of fan blades 144 and the RPM at which they rotate provide a certain level of thrust to the projectile 102. The RPM of the fan blades 144 is directly related to the output of the revolving turbine 104 and the speed reduction gearbox 136, if used.

The unducted fan type propeller 140 is positioned external to the projectile 102 as shown in FIG. 4 and serves the identical function as the ducted fan type propeller 134 shown in FIG. 3. Since the unducted fan type propeller 140 is externally located, it can be much larger than the ducted fan type propeller 134. Therefore, the unducted fan type propeller 140 can produce a greater thrust for the same amount of energy expended by the solid fuel stick 114. For example, a twenty pound, 6" diameter projectile 102 fitted with an unducted fan type propeller 140 will produce more thrust and travel further than the same projectile fitted with the ducted fan type propeller 134.

A plurality of fan blades 150 of the unducted fan type propeller 140 is shown in FIG. 4. The fan blades 150 are shown mounted to a center cog 152 having a penetration 154 for accommodating the output drive shaft 138. The fan blades 150 also serve to compress the mixture of exhaust gases 124 and ambient air. The number of fan blades 150 and the RPM at which they rotate provide a certain level of thrust to the projectile 102. The RPM of the fan blades 150 is also directly related to the output of the revolving turbine 104 and the speed reduction gearbox 136, if used.

In operation, the solid fuel stick 114 is remotely ignited via the squib 116. The ignited fuel stick 114 burns at a rate to provide hot pressurized gases at a specific volume, temperature and pressure. The pressurized gases are directed to the plenum 108 and are exhausted therefrom through the plurality of angled gas jets 120 formed therein. The exhaust gases 124 cause the revolving turbine 104 which includes the combustion chamber 106 and the plenum 108 to rotate the turbine axis 112. The speed of the turbine axis 112 is adjusted by the speed reduction gearbox 136 which operates the output drive shaft 138. The output drive shaft 138, thereafter drives a load such as the ducted fan type propeller 134 or the unducted fan type propeller 140. Either of the fan type propellers 134 or 140 provide the thrust of the power plant 100 to drive the projectile 102 during flight.

Simplified first and second alternative embodiments of the solid fuel pinwheel power plant of the present invention are shown in FIGS. 5-8 and FIGS. 9-10, respectively. In each instance, the alternative embodiments of FIGS.. 5-8 and FIGS. 9-10 incorporate a revolving turbine having a solid fuel stick and a plurality of gas jets similar to the corresponding components of the power plant 100 of the preferred embodiment shown in FIGS. 1-4. Components of the solid fuel pinwheel power plant of FIGS. 5-8 and FIGS. 9-10 which find substantial correspondence in structure and function to those components of FIGS. 1-4 are designated with corresponding reference numerals of the two-hundred and three-hundred series, respectively.

The solid fuel pinwheel power plant 200 shown in FIGS. 5-8 is located within a projectile 202 and includes a revolving turbine 204 comprising both a combustion chamber 206 and a plenum 208. It is noted that the shape of the revolving turbine 204 of the power plant 200 has been streamlined compared to the revolving turbine of the power plant 100. The revolving turbine 204 is supported within the projectile 202 by a solid fuel encasement support 209 and a spindle support member 210. The solid fuel encasement support 209 is rigidly attached to a metal housing 229 of the projectile 202 and serves to support the revolving turbine 204 from one end. Extending outward from the revolving turbine 204 is a turbine axis 212.

Figure 5:
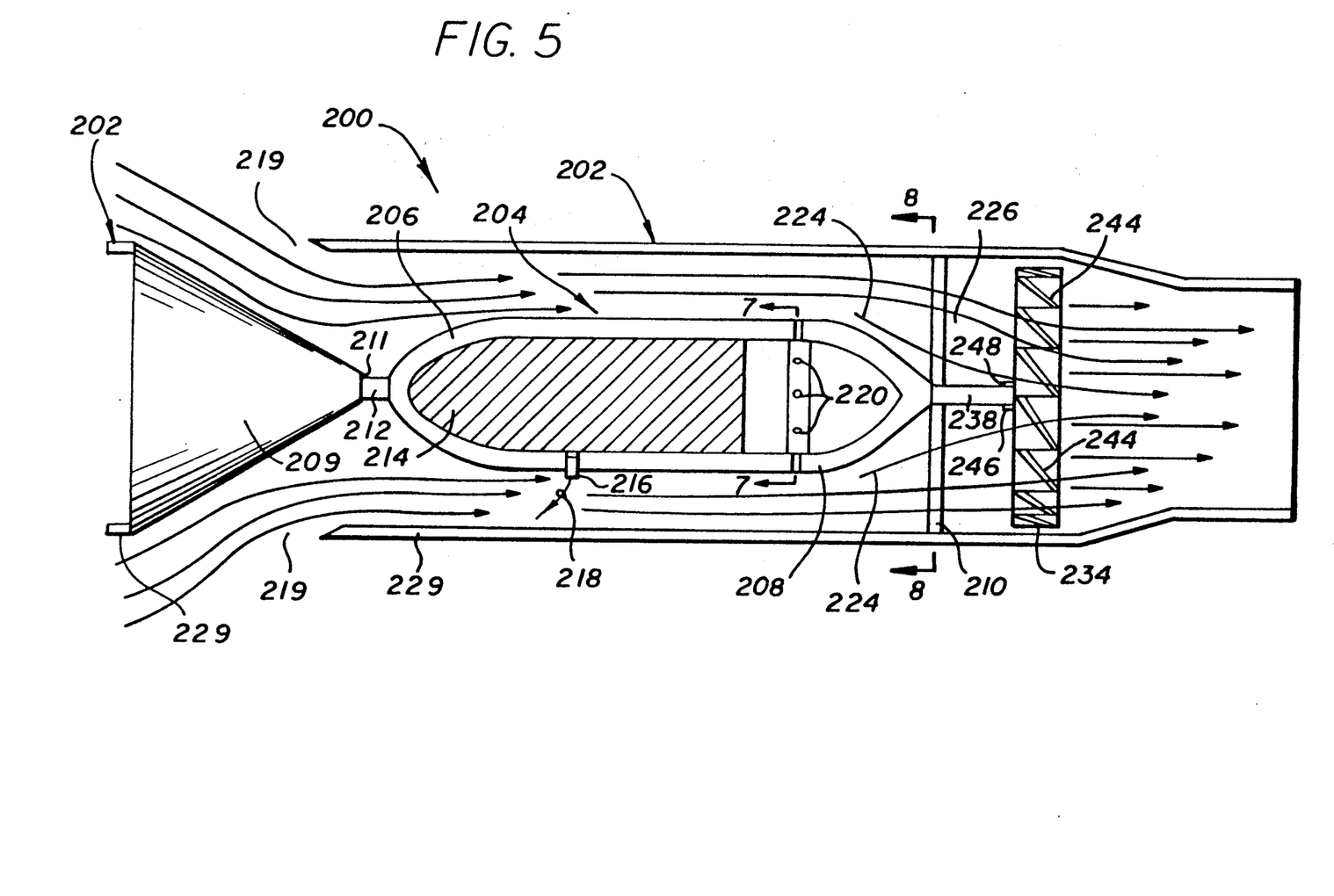
FIG. 5 is a first alternative embodiment of the solid fuel pinwheel power plant of the present invention showing a modified plenum and a ducted fan type propeller as a load positioned within a projectile tube.
Figure 8:
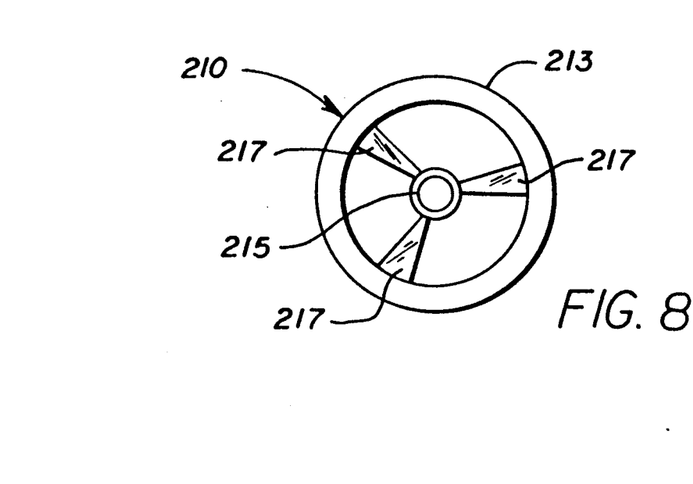
FIG. 8 is a cross-sectional view of the solid fuel pinwheel power plant taken along the line 8—8 of FIG. 6 showing the plenum spindle support.

In FIG. 5, the turbine axis 212 extends outward from the combustion chamber 206 portion of the revolving turbine 204 and interfaces with the solid fuel encasement support 209. The solid fuel encasement support is designed to permit the turbine axis 212 to rotate and therefore includes a suitable bearing 211. Extending outward from the plenum 208 is an output drive shaft 238. The output drive shaft 238 is supported by the spindle support member 210 which is also rigidly attached to the metal housing 229 of the projectile 202. The spindle support member 210 is shown in FIG. 8. The spindle support member 210 includes an outer ring 213 connected to an inner ring 215 by a plurality of spindle spokes 217. In FIG. 5, the inner ring 215 of the spindle support member 210 is sized to accommodate the output drive shaft 238.

The combustion chamber 206 contains a stick of solid fuel 214 for generating pressurized gases of a specific pressure and velocity. The diameter of the fuel stick 214 and the burning rate control the density, temperature and pressure of the gases generated. By burning the solid fuel stick 214 and providing a pressurized gas source, high energy can be generated to produce thrust to propel the projectile 202. The solid fuel stick 214 can be made from smokeless insensitive munitions propellant and have dimensions suitable for the intended application. The chemical base and characteristics of the fuel stick 214 are duplicate to that previously described with respect to the power plant 100.

Figure 6:
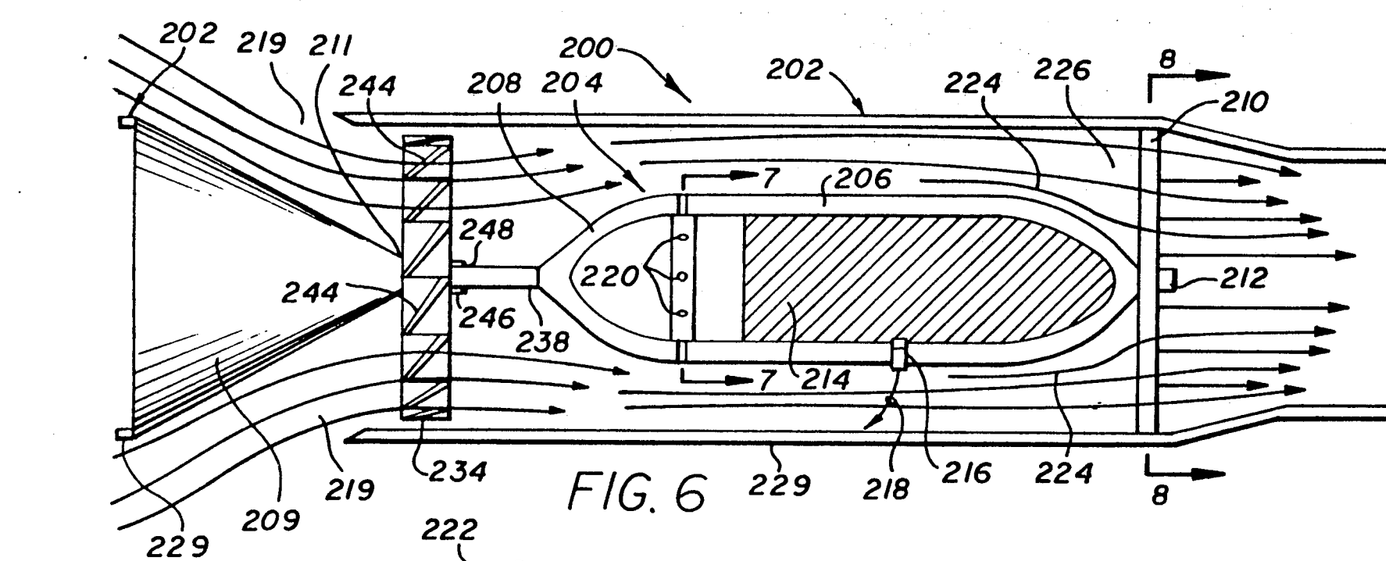
FIG. 6 is an elevational view partly in cross-section of the solid fuel pinwheel power plant of FIG. 5 showing the modified plenum and ducted fan type propeller assembled in reverse order.

The solid fuel stick 214 is energized or ignited by a squib or igniter 216 which is shown symbolically in FIGS. 5 and 6. The squib 216 can be, for example, a glow plug which is controlled from a remote location such as a launch panel. Specifically, the squib 216 applies electrically generated heat to the fuel stick 214 from a source (not shown) through a power lead 218 to achieve ignition and burning of the fuel stick 214 as previously described. Hot pressurized gases are generated by the fuel stick 214 and are directed to the plenum 208 to spin the revolving turbine 204 about the turbine axis 212. As in the preferred embodiment, the revolving turbine 204 is of a pinwheel design which is driven by the pressurized gases generated by the solid fuel stick 214 housed within the combustion chamber 206.

Figure 7:
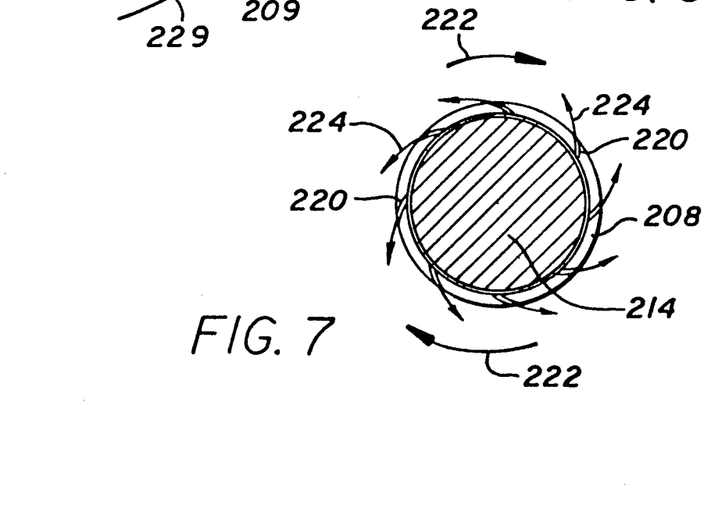
FIG. 7 is a cross-sectional view of the solid fuel pinwheel power plant taken along the line 7—7 of FIGS. 5 and 6 showing the entire rotating plenum.

The streamlined plenum 208 of the revolving turbine 204 includes a plurality of angled exhaust openings or gas jets 220 positioned along the inner periphery or circumference of the plenum 208 as shown in FIGS. 5 and 6. Any number of separate lines of gas jets 220 can be formed in the plenum 208 that is consistent with the plenum design. The gas jets 220 permit the hot pressurized gases generated by the burning solid fuel stick 214 to escape from the plenum 208. The angle of the gas jets 220 extending through the plenum 208 permits the rotation of the revolving turbine 204 and the turbine axis 212. FIG. 7 illustrates that the rotation (designated by numeral 222) of the revolving turbine 204 and the turbine axis 212 is in a direction opposite to the direction of the exhaust gases (designated by numeral 224). Thus, the rotation of the revolving turbine 204 and the turbine axis 212 carries with it the combustion chamber 206 including the solid fuel stick 214 located therein and the plenum 208. The gases (designated by numeral 224) exhausted from the gas jets 220 are then directed to an exhaust region 226 of the revolving turbine 204.

The metal housing 229 of the projectile 202 includes a vent 219 as shown in both FIGS. 5 and 6. The function of the vent 219 is to admit ambient air into the projectile 202. The ambient air is drawn into the projectile 202 by the ducted fan type propeller 234. The ambient air is then mixed with the exhaust gases 224 from the revolving turbine 204 to dissipate the heat contained therein. The dissipation of the heat in the exhaust gases makes the power plant 200 and the projectile 202 less vulnerable to detection by infrared type sensor devices. The mixture is then fed to the ducted fan type propeller 234 to provide the thrust to propel the projectile 102.

The rotation of the turbine axis 212 developes the torque necessary to drive the ducted fan type propeller 234 shown in FIGS. 5 and 6. A plurality of loads can be driven by the power plant 200. As an example, it is noted that the power plant 200 can be modified to accommodate an unducted fan type propeller. The load is attached to the power plant 200 via the output drive shaft 238 extending from the plenum 208. The conventional speed reduction gearbox shown in FIGS. 1, 3 and 4 is not utilized in the power plant 200. The ducted fan type propeller 234 shown in FIGS. 5 and 6 is duplicate to that disclosed in FIG. 3 of the power plant 100. The ducted fan type propeller 234 serves to provide the thrust to the projectile 202 by compressing (e.g., speeding up) the air as the air passes through the metal housing 229. A plurality of fan blades 244 of the ducted fan type propeller 234 are shown mounted to a center cog 246 having a penetration 248 for accommodating the output drive shaft 238. The fan blades 244 serve to compress the mixture of exhaust gases 224 and ambient air. The number of fan blades 244 and the RPM at which they rotate provide a certain level of thrust to the projectile 202. The RPM of the fan blades 244 is directly related to the output of the revolving turbine 204.

The solid fuel pinwheel power plant 200 of the present invention is shown in FIG. 6 with the streamlined revolving turbine 204 and the ducted fan type propeller 234 assembled in reverse order. Since the power plant 200 is utilized to drive the projectile 202, the projectile 202 and thus the power plant 200 are subjected to G-forces. The solid fuel stick 214 is also subjected to the G-forces. In order to prevent the gas jets 220 from being plugged with fuel stick particles, the solid fuel stick 214 is positioned behind the plenum 208. The turbine axis 212 is supported by the spindle support member 210 (shown in FIG. 8) rigidly mounted to the metal housing 229 of the projectile 202. Likewise, the output drive shaft 238 extending from the plenum 208 is supported by the solid fuel encasement support 209. A solid fuel encasement bearing 211 is provided to permit the rotation of the output drive shaft 238. The ducted fan type propeller 234 is mounted on the drive shaft 238 at the interface of the drive shaft 238 with the solid fuel encasement support 209. The remainder of the construction of the power plant 200 shown in FIG. 6 is the same as that described with respect to FIG. 5.

In operation, the solid fuel stick 214 is remotely ignited via a squib 216 shown in FIGS. 5 and 6. The ignited fuel stick 214 burns at a rate to provide hot pressurized gases at a specific volume, temperature and pressure. The pressurized gases are directed to the plenum 208 and are exhausted therefrom through the plurality of angled gas jets 220 formed therein. The exhaust gases 224 cause the revolving turbine 204 which includes the combustion chamber 206 and the plenum 208 to rotate the output drive shaft 238. The output drive shaft 238 thereafter drives the ducted fan type propeller 234. The ducted fan type propeller 234 provides the thrust of the power plant 200 to drive the projectile 202 during flight.

Figures 9, 10:
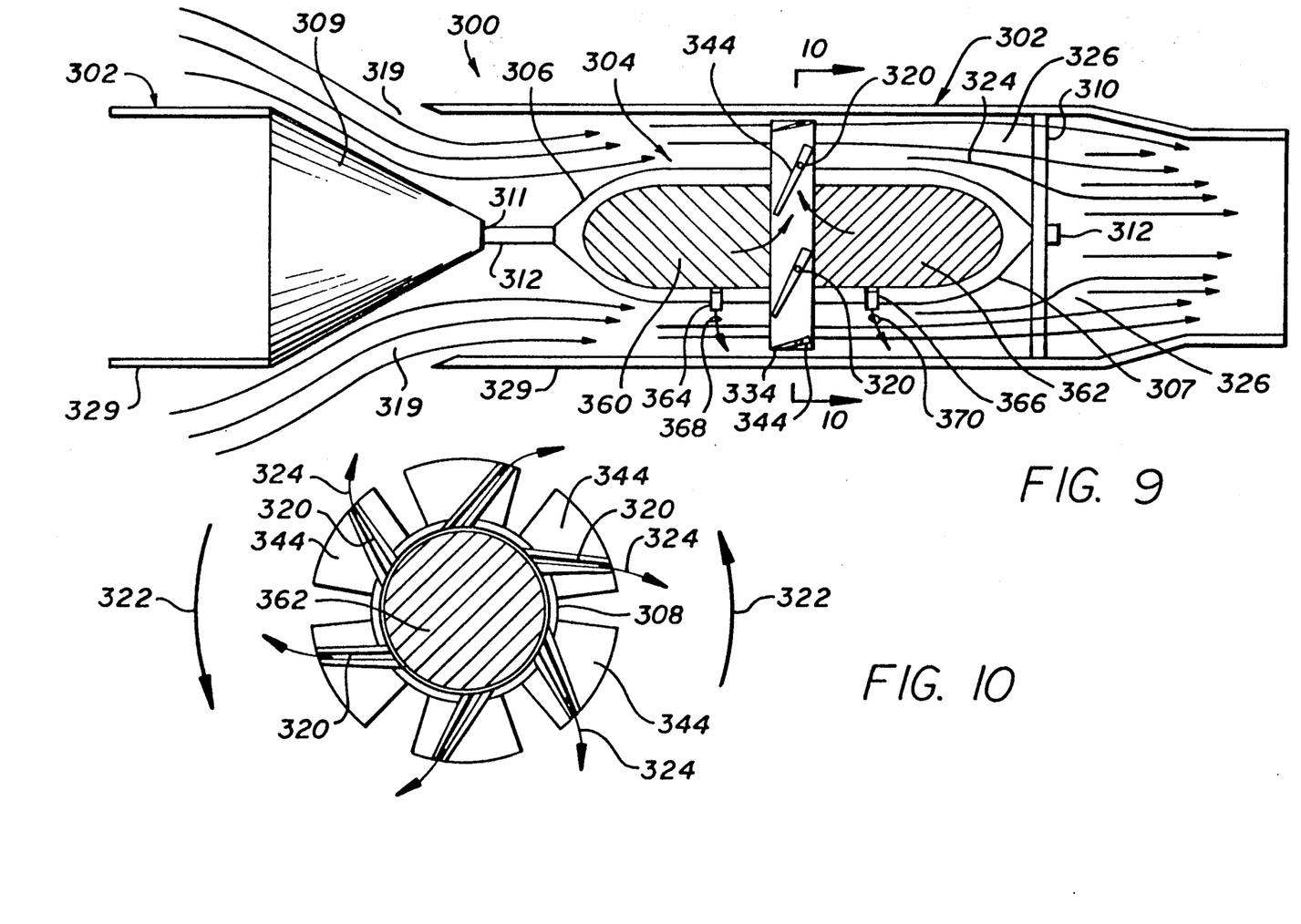
FIG. 9 is a second alternative embodiment of the solid fuel pinwheel power plant of the present invention showing a pair of solid fuel sticks mounted within a plenum on each side of a ducted fan type propeller.
FIG. 10 is a cross-sectional view of the solid fuel pinwheel power plant taken along the line 10—10 of FIG. 9 showing the entire rotating plenum and ducted fan.

The second alternative embodiment of the present invention is shown in FIGS. 9-10. The solid fuel pinwheel power plant 300 is mounted within a projectile 302 and includes a revolving turbine 304 as shown in FIG. 9. The revolving turbine 304 comprises a pair of combustion chambers 306 and 307 each containing a separate solid fuel stick 360 and 362, respectively. Positioned between the solid fuel sticks 360 and 362 is a plenum 308 shown best in FIG. 10. The solid fuel sticks 360 and 362 can be comprised of the same chemical composition and operate in the same manner to generate hot pressurized gases as previously described with respect to the power plants 100 and 200. Each of the solid fuel sticks 360 and 362 includes a corresponding squib 364 and 366 to ignite the fuel sticks 360 and 362 as previously described. Each of the squibs 364 and 366 are energized through an electrical lead 368 and 370, respectively.

The hot pressurized gases generated by the fuel sticks 360 and 362 are directed to the plenum 308. The plenum 308 can be integral with the interface of the combustion chambers 306 and 307. Formed within the plenum 308 is a plurality of exhaust openings or gas jets 320 which permit the escape of the hot pressurized gases generated by the fuel sticks 360 and 362. The gas jets 320 are angled as shown in FIG. 10 to generate the force to rotate the plenum 308. The rotation (designated by numeral 322) of the plenum 308 is in a direction opposite to the direction of the exhaust gases (designated by numeral 324).

Mounted directly above or integral with the plenum 308 is a ducted fan type propeller 334 having a plurality of fan blades 344. Each of the fan blades 344 includes at lease one gas jet 320 formed therein as shown in FIG. 10. Thus, the torque generated by the exhausted pressurized gases 324 causes the fan blades 344 to rotate with the plenum 308. Use of several stages of fan blades 344 in combination with corresponding gas jets 320 produces a compressor effect and the thrust to propel the projectile 302. The burning rate of the fuel sticks 360 and 362 and the diameter of the gas jets 320 determines the torque generated to drive the pinwheel power plant 300.

The revolving turbine 304 is supported by a solid fuel encasement support 309 and a spindle support member 310. The solid fuel encasement support 309 is rigidly attached to a metal housing 329 of the projectile 302 and serves to support the revolving turbine 304 from one end. Extending outward from the revolving turbine 304 is a turbine axis 312. The solid fuel encasement support 309 includes a solid fuel encasement bearing 311 to permit the turbine axis 312 to rotate with the revolving turbine 304. The turbine axis 312 also extends outward from the opposite end of the revolving turbine 304. The turbine axis 312 extending from the opposite end of the revolving turbine 304 is supported by a spindle support member 310 rigidly mounted to the metal housing 329 of the projectile 302. The spindle support member 310 was previously described with reference to FIG. 8.

Formed within the metal housing 329 of the projectile 302 is a vent 319 which serves to admit ambient air into the projectile 302. The ambient air is drawn into the projectile 302 by the suction of the ducted fan type propeller 334. The ambient air mixes with the exhaust gases 324 in an exhaust region 326 to dissipate the heat contained therein. The dissipation of the heat in the exhaust gases makes the power plant 300 and the projectile 302 less vulnerable to detection by infrared type sensor devices. The mixture of exhaust gases 324 and ambient air pulled through the metal housing 329 by the ducted fan type propeller 334 provides the thrust to propel the projectile 302. The remaining elements of the power plant 300 are very similar to those previously described in the power plants 100 and 200 disclosed herein.

In operation, the solid fuel sticks 360 and 362 are remotely ignited via the squibs 364 and 366 shown in FIG. 9. The ignited fuel sticks 360 and 362 burn at a rate to provide hot pressurized gases at a specific volume, temperature and pressure. The pressurized gases are directed to both sides of the plenum 308. The gases from each fuel stick 360 and 362 are exhausted therefrom through the plurality of angled gas jets 320 formed in the plenum 308 and in the plurality of fan blades 344. The exhaust gases 324 cause the revolving turbine 304, which includes the combustion chambers 306 and 307 and the plenum 308, to rotate the ducted fan type propeller 334. The ducted fan type propeller 334 provides the thrust of the power plant 300 to drive the projectile 302 during flight.

The present invention generates low levels of noise and heat which renders the power plant 100 and thus the projectile 102 less vulnerable to detection by audible and infrared sensor type devices. Thus, the power plant 100 of the present invention is suitable for use in stealth type devices and in devices requiring a quiet, low IR signature, short term power source. Further, if a smokeless insensitive munitions propellant is employed, the power plant 100 does not produce smoke rendering it less detectable. The present invention is useful as an inexpensive replacement power plant for solid/liquid fueled rockets and small jet and piston engines. The power plant 100 is also compact, lightweight and can be made reusable in commercial applications by replacing the solid fuel stick 114. An example of a commercial application includes driving a small power wench for moving a load or a d.c. generator for energizing a field radio to transmit a geographical position. The present invention is a short duration power plant which can be designed to provide power for approximately one to five minutes.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. A low noise power plant for providing thrust to a missile comprising:
    a housing;
    a combustion chamber containing a solid fuel propellant for generating a pressurized gas;
    a plenum integral with said combustion chamber for receiving said pressurized gas, said combustion chamber and said plenum forming an integral structure disposed in said housing and supported for revolving on a central axis within said housing;
    a pinwheel turbine means disposed within and integral with said plenum, said pinwheel turbine means having exhaust passages for providing gas jets that provide rotation-inducing force for revolving said integral structure on said central axis;
    means for coupling the revolving motion of said integral structure to a fan for generating thrust; and
    a diffuser plate for directing said gas jets from said pinwheel turbine means to said fan.

2. The low noise power plant of claim 1 wherein said sold fuel propellant is comprised of one of a class of combustible materials including nitrocellulose and nitroglycerin.

3. A solid fuel power plant as recited in claim 1 wherein said combustion chamber includes two opposing chambers and said pinwheel turbine means is disposed between said two opposing chambers.

4. A solid fuel power plant as recited in claim 1 wherein said fan includes a ducted type fan coupled to said central axis downstream of said combustion chamber for receiving said gas jets and external air.

5. A solid fuel power plant as recited in claim 1 wherein said fan includes a ducted type fan coupled to said central axis upstream of said combustion chamber for receiving external air for mixing with the gas jets.

6. The low noise power plant of claim 1 further including means for reducing the speed of said fan.

7. The low noise power plant of claim 6 wherein said speed reducing means includes a speed reduction gearbox.

* * * * *